United States Patent
Peswani (10) Patent No.: US 9,387,773 B2
(45) Date of Patent: Jul. 12, 2016

(54) SYSTEM AND METHOD FOR DERATING A POWER LIMIT ASSOCIATED WITH A BATTERY PACK

(71) Applicant: Sanjay Peswani, Canton, MI (US)

(72) Inventor: Sanjay Peswani, Canton, MI (US)

(73) Assignee: LG Chem, Ltd., Seoul (KR)

( * ) Notice: Subject to any disclaimer, the term of this patent is extended or adjusted under 35 U.S.C. 154(b) by 489 days.

(21) Appl. No.: 13/731,046

(22) Filed: Dec. 30, 2012

(65) Prior Publication Data
US 2014/0183938 A1 Jul. 3, 2014

(51) Int. Cl.
*B60L 3/04* (2006.01)
*H02J 1/00* (2006.01)
*B60L 11/18* (2006.01)
*B60L 3/00* (2006.01)
(Continued)

(52) U.S. Cl.
CPC ........... *B60L 11/1859* (2013.01); *B60L 3/0046* (2013.01); *B60L 3/04* (2013.01); *B60L 11/1803* (2013.01); *B60L 11/1864* (2013.01); *H02J 1/00* (2013.01); *H02J 7/0029* (2013.01); *H02J 7/0031* (2013.01); *B60L 2240/545* (2013.01); *B60L 2240/547* (2013.01); *B60L 2240/549* (2013.01); *B60L 2240/80* (2013.01); *H01M 10/448* (2013.01); *H02J 7/0004* (2013.01); *H02J 2007/004* (2013.01); *H02J 2007/0037* (2013.01); *Y02T 10/7005* (2013.01); *Y02T 10/7061* (2013.01)

(58) Field of Classification Search
CPC .. B60L 11/1859; Y02T 90/16; Y02T 10/7005

USPC .................................................. 307/9.1, 150
See application file for complete search history.

(56) References Cited

U.S. PATENT DOCUMENTS

| 2003/0042866 A1 | 3/2003 | Minamiura et al. |
| 2005/0074048 A1 | 4/2005 | Wu et al. |

(Continued)

FOREIGN PATENT DOCUMENTS

| JP | H10106638 A | 4/1998 |
| JP | 2002171685 A | 6/2002 |
| JP | 2003323178 A | 11/2003 |
| KR | 20060130509 | 12/2006 |

OTHER PUBLICATIONS

U.S. Appl. No. 13/327,103, filed Dec. 15, 2011 entitled System and Method for Determining Charging and Discharging Power Levels for a Battery Pack.

(Continued)

*Primary Examiner* — Rexford Barnie
*Assistant Examiner* — Thai Tran
(74) *Attorney, Agent, or Firm* — Buckert Patent & Trademark Law Firm, PC; John F. Buckert (57) ABSTRACT

A system for derating a power limit associated with a battery pack is provided. The system includes a battery pack voltage sensor that measures a first battery pack output voltage of the battery pack at a first time, and a microprocessor that determines an initial power limit of the battery pack based on at least one operational parameter of the battery pack. The microprocessor further determines whether the first battery pack output voltage is greater than a threshold battery pack voltage. The microprocessor further determines a first power limit of the battery pack that is less than the initial power limit, if the first battery pack output voltage is greater than the threshold battery pack voltage.

16 Claims, 4 Drawing Sheets

(51) Int. Cl.
*H01M 10/44* (2006.01)
*H02J 7/00* (2006.01)

(56) References Cited

U.S. PATENT DOCUMENTS

| | | | |
|---|---|---|---|
| 2006/0284614 A1* | 12/2006 | Kim | H02J 7/0077 324/149 |
| 2009/0325053 A1 | 12/2009 | Koetting et al. | |
| 2010/0292880 A1* | 11/2010 | McGrogan | B60K 6/48 701/22 |
| 2011/0320076 A1* | 12/2011 | Shin | B60K 6/48 701/22 |
| 2012/0295141 A1 | 11/2012 | Allen | |

OTHER PUBLICATIONS

Wong et al.; "Charge regimes for valve-regulated lead-acid batteries: Performance overview inclusive of temperature compensation"; Journal of Power Sources, vol. 183, published 2008, pp. 783-791.

* cited by examiner

SYSTEM AND METHOD FOR DERATING A POWER LIMIT ASSOCIATED WITH A BATTERY PACK

BACKGROUND

A battery pack having a plurality of battery cells therein has been utilized to provide power for an electric vehicle. However, if an amount of power extracted from the battery pack exceeds a desired amount of power, the operation of the battery pack can be degraded.

Accordingly, the inventor herein has recognized a need for a system and a method for derating a power limit associated with a battery pack that minimizes and/or eliminates the above-mentioned operational issue.

SUMMARY

A system for derating a power limit associated with a battery pack in accordance with an exemplary embodiment is provided. The system includes a battery pack voltage sensor configured to measure a first battery pack output voltage of the battery pack at a first time. The system further includes a microprocessor programmed to operably communicate with the battery pack voltage sensor. The microprocessor is further programmed to determine an initial power limit of the battery pack based on at least one operational parameter of the battery pack. The microprocessor is further programmed to determine whether the first battery pack output voltage is greater than a threshold battery pack voltage. The microprocessor is further programmed to determine a first power limit of the battery pack that is less than the initial power limit, if the first battery pack output voltage is greater than the threshold battery pack voltage. The microprocessor is further programmed to transmit a first message having the first power limit on a communication bus.

A method for derating a power limit associated with a battery pack in accordance with another exemplary embodiment is provided. The method includes determining an initial power limit of the battery pack based on at least one operational parameter of the battery pack utilizing a microprocessor. The method further includes determining whether a first battery pack output voltage of the battery pack at a first time is greater than a threshold battery pack voltage, utilizing the microprocessor. The method further includes determining a first power limit of the battery pack that is less than the initial power limit if the first battery pack output voltage is greater than a threshold battery pack voltage, utilizing the microprocessor. The method further includes transmitting a first message having the first power limit on a communication bus utilizing the microprocessor.

DETAILED DESCRIPTION

Figure 1:
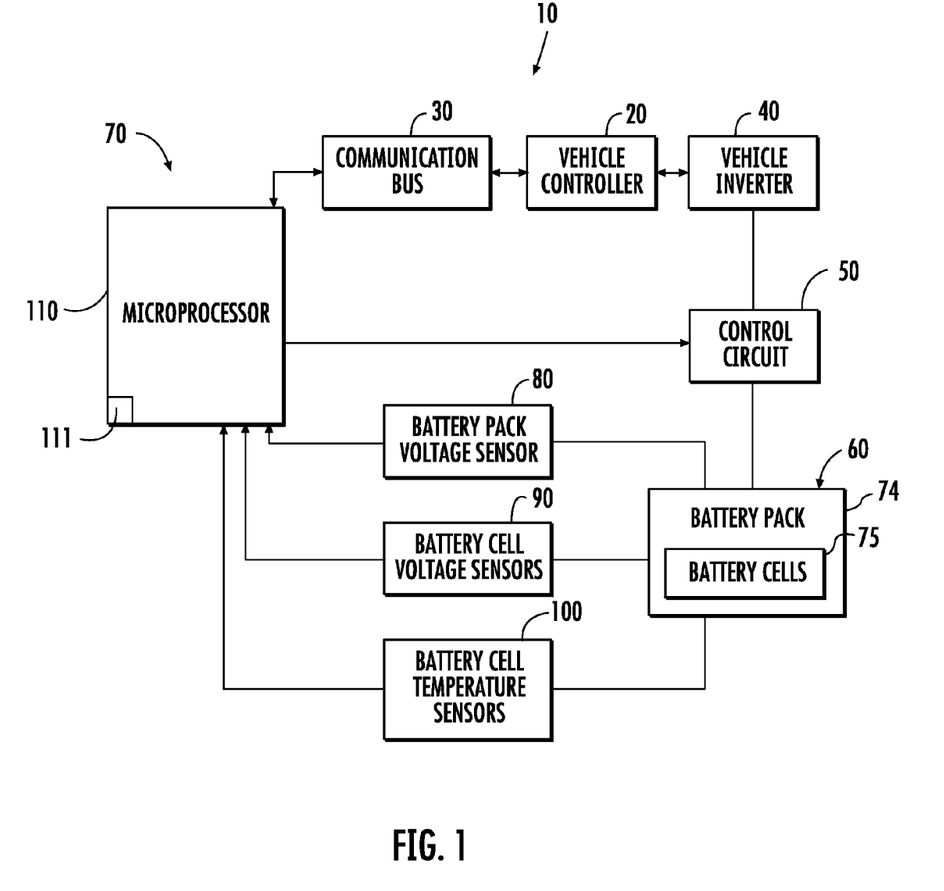
FIG. 1 is a block diagram of a system for derating a power limit associated with a battery pack in accordance with an exemplary embodiment.

Referring to FIG. 1, an electric vehicle 10 is provided. The electric vehicle 10 includes a vehicle controller 20, a communication bus 30, a vehicle inverter 40, a control circuit 50, and a battery pack 60. The electrical vehicle 10 further includes a system 70 for derating a power limit of the battery pack 60 in accordance with an exemplary embodiment.

The vehicle controller 20 is configured to operably communicate with the inverter 40, and to operably communicate with a microprocessor 110 via the communication bus 30. The vehicle controller 20 is configured to receive a message from the microprocessor 100 via the communication bus 30 having a power limit indicating an amount of power that the battery pack 60 can output. The vehicle controller 20 is further configured to send a message to the vehicle inverter 40 to command the vehicle inverter 40 to only extract an amount of power from the battery pack 60 equal to the power limit. Of course, alternatively, the vehicle controller 20 could command the vehicle inverter 40 to extract an amount of power from the battery pack 60 that is less than the power limit if needed, or to extract an amount power from the battery pack 60 that is greater than the power limit if needed.

The control circuit 50 is configured to selectively electrically couple the battery pack 60 to the vehicle inverter 40 based on control signals from the microprocessor 110. The control circuit 50 is further configured to selectively electrically de-couple the battery pack 60 from the inverter 40 when the control circuit 50 no longer receives the control signals from the microprocessor 110.

The battery pack 60 is configured to generate an operational voltage for the electric vehicle 10. The battery pack 60 includes an enclosure 74 and a plurality of battery cells 75 therein. In an exemplary embodiment, the battery cells 75 are electrically coupled in series with one another. In another exemplary embodiment, the battery pack 60 has a plurality of cell groups electrically coupled in series with each other, wherein each cell group comprises three battery cells 75 electrically coupled in parallel to one another. In one exemplary embodiment, the battery cells 75 are lithium-ion battery cells. Of course, in alternative embodiments, the battery cells 75 could be other types of battery cells known to those skilled in the art such as nickel-metal hydride battery cells for example.

The system 70 is configured to derate or reduce a power limit of the battery pack 60 when a battery pack output voltage of the battery pack 60 is greater than a threshold battery pack voltage to prevent the battery pack 60 from having degraded operation. The system 70 includes a battery pack voltage sensor 80, battery cell voltage sensors 90, battery cell temperature sensors 100, and a microprocessor 110.

The battery pack voltage sensor 80 is configured to measure a battery pack output voltage of the battery pack 60 and to generate signal indicative of the battery pack output voltage that is received by the microprocessor 110. The battery pack voltage sensor 80 is electrically coupled to both the battery pack 60 and to the microprocessor 110.

The battery cell voltage sensors 90 are configured to measure a plurality of battery cell output voltages of the battery cells 75 and to generate signals indicative of the battery cell output voltages that are received by the microprocessor 110. In particular, each battery cell voltage sensor 90 measures a respective battery cell output voltage of a respective battery cell 75 or a respective parallel-coupled group of battery cells 75 and generates a signal indicative of the battery cell output voltage that is received by the microprocessor 110. The battery cell voltage sensors 90 are electrically coupled to both the battery cells 75 and to the microprocessor 110.

The battery cell temperature sensors 100 are configured to measure a plurality of battery cell temperatures of the battery cells 75 and to generate signals indicative of the battery cell temperatures that are received by the microprocessor 110. In particular, each battery cell temperature sensor 100 measures a respective battery cell temperature of a respective battery cell 75 or a respective parallel-coupled group of battery cells 75 and generates a signal indicative of the battery cell temperature that is received by the microprocessor 110. The battery cell temperature sensors 100 are electrically coupled to both the battery cells 75 and to the microprocessor 110.

The microprocessor 110 is configured to communicate with the vehicle controller 20 utilizing the communication bus 30. The microprocessor 110 is further configured to receive signals from the battery pack voltage sensor 80, the battery cell voltage sensors 90, and the battery cell temperature sensors 100. The microprocessor 110 is further configured to generate control signals to induce the control circuit 50 to electrically couple the battery pack 60 to the inverter 40, and to induce the control circuit 50 to electrically de-couple the battery pack 60 from the inverter 40. The microprocessor 110 is programmed to implement at least some of the steps in the flowchart of FIGS. 2-3 utilizing software commands stored in a memory device 111.

Figure 2:
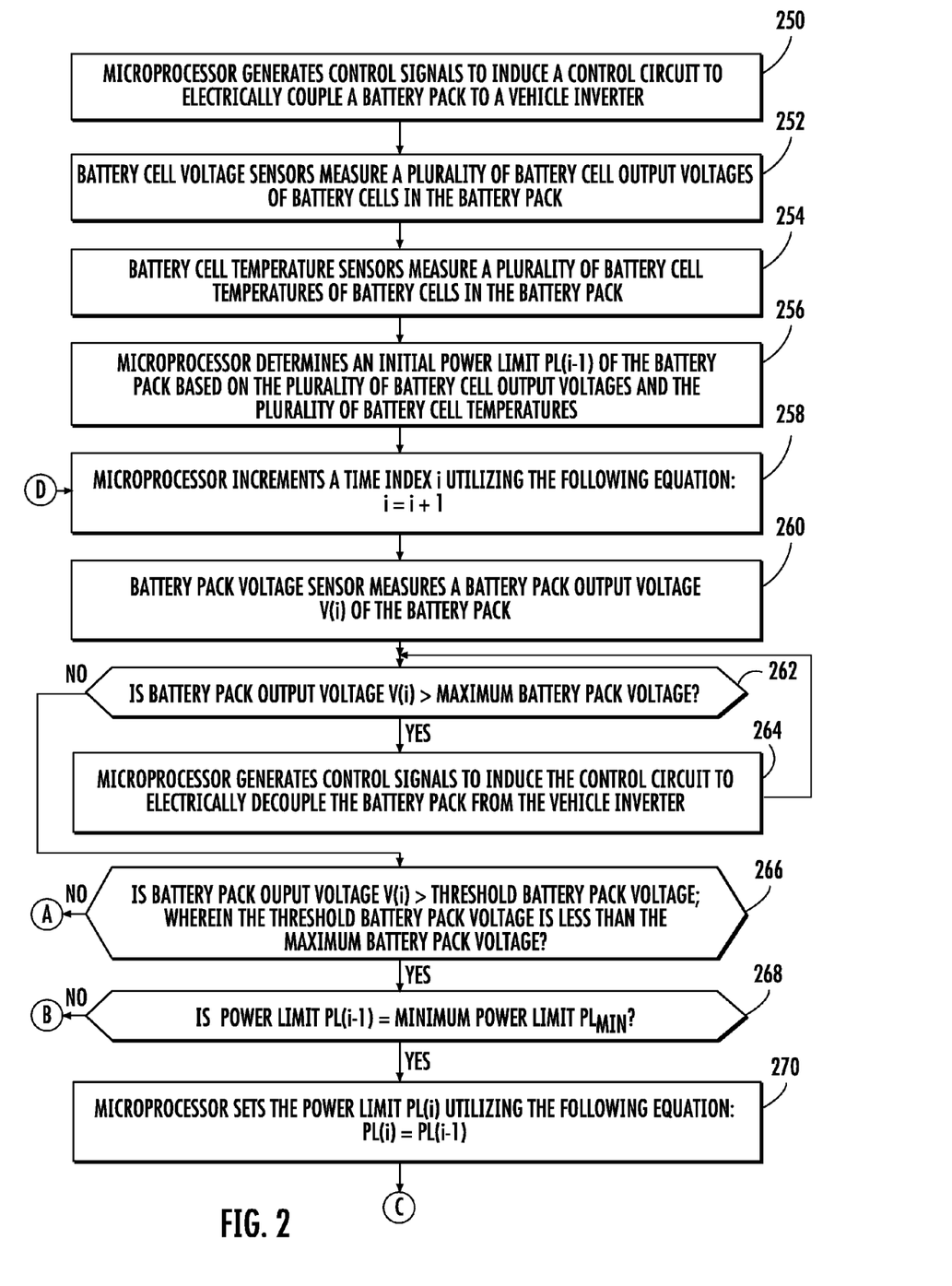
FIGS. 2 and 3 is a flowchart of a method for derating a power limit associated with the battery pack in accordance with another exemplary embodiment.
Figure 3:
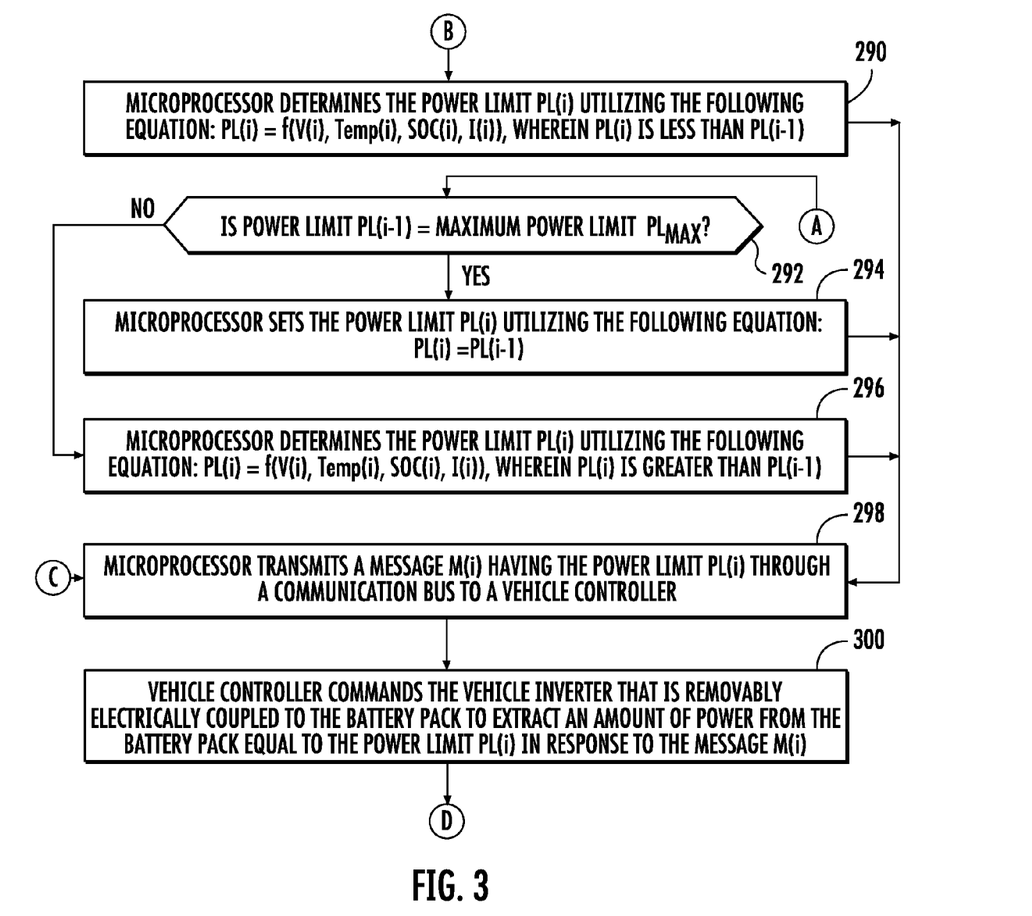

Referring to FIGS. 2-3 a flowchart of a method for derating a power limit associated with the battery pack 60 in accordance with another exemplary embodiment will now be explained. The microprocessor 110 is programmed to execute the microprocessor implemented steps described in the below flowchart.

At step 250, the microprocessor 110 generates control signals to induce the control circuit 50 to electrically couple the battery pack 60 to the vehicle inverter 40. After step 250, the method advances to step 252.

At step 252, the battery cell voltage sensors 90 measure a plurality of battery cell output voltages of battery cells 75 in the battery pack 60. After step 252, the method advances to step 254.

At step 254, the battery cell temperature sensors 100 measure a plurality of battery cell temperatures of battery cells 75 in the battery pack 60. After step 254, the method advances to step 256.

At step 256, the microprocessor 110 determines an initial power limit PL(i−1) of the battery pack 60 based on the plurality of battery cell output voltages and the plurality of battery cell temperatures. After step 256, the method advances to step 258.

At step 258, the microprocessor 110 increments a time index i utilizing the following equation: i=i+1. After step 258, the method advances to step 260.

At step 260, the battery pack voltage sensor 80 measures a battery pack output voltage V(i) of the battery pack 60. After step 260, the method advances to step 262.

At step 262, the microprocessor 110 makes a determination as to whether the battery pack output voltage V(i) is greater than a maximum battery pack voltage. If the value of step 262 equals "yes", the method advances to step 264. Otherwise, the method advances to step 266. In one exemplary embodiment, the maximum battery pack voltage is 413 Vdc.

At step 264, the microprocessor 110 generates control signals to induce the control circuit 50 to electrically de-couple the battery pack 60 from the vehicle inverter 40. After step 264, the method returns to step 262.

Referring again to step 262, if a value of step 262 equals "no", the method advances to step 266. At step 266, the microprocessor 110 makes a determination as to whether the battery pack output voltage V(i) is greater than a threshold battery pack voltage, wherein the threshold battery pack voltage is less than the maximum battery pack voltage. In one exemplary embodiment, the threshold battery pack voltage is 400 Vdc. If the value of step 266 equals "yes", the method advances to step 268. Otherwise, the method advances to step 292.

At step 268, the microprocessor 110 makes a determination as to whether the power limit PL(i−1) is equal to the minimum power limit $PL_{MIN}$. If the value of step 268 equals "yes", the method advances to step 270. Otherwise, the method advances to step 290.

At step 270, the microprocessor 110 sets the power limit PL(i) utilizing the following equation: PL(i)=PL(i−1). After step 270, the method advances to step 290.

Referring again to step 268, if the value of step 268 equals "no", the method advances to step 290. At step 290, the microprocessor 110 determines the power limit PL(i) utilizing the following equation: PL(i)=f (V(i), Temp(i), SOC(i), I(i)), wherein PL(i) is less than PL(i−1). The "f" corresponds to a function. The "V(i)" value corresponds to the battery pack output voltage. The "Temp(i)" value corresponds to the battery pack temperature determined from the plurality of battery cell temperatures of the battery cells 75 in the battery pack 60. The "SOC(i)" value corresponds to the state of charge of the battery pack 60 which is determined in part from V(i). The "I(i)" value corresponds to the amount of electrical current flowing through the battery pack 60. The I(i) value can be determined based on the V(i) value. Alternately, the I(i) value can be determined by utilizing an electrical current sensor (not shown) that is electrically in series with the battery pack 60 that generates a signal indicative of the electrical current flowing through the battery pack 60, the signal being received by the microprocessor 110. After step 290, the method advances to step 298.

Referring again to step 266, if the value of step 266 equals "no", the method advances to step 292. At step 292, the microprocessor 110 makes a determination as to whether the power limit PL(i−1) is equal to the maximum power limit $PL_{MAX}$. If the value of step 292 equals "yes", the method advances to step 294. Otherwise, the method advances to step 296.

At step 294, the microprocessor 110 sets the power limit PL(i) utilizing the following equation: PL(i)=PL(i−1). After step 294, the method advances to step 298.

Referring again to step 292, if the value of step 292 equals "no", the method advances to step 296. At step 296, the microprocessor 110 determines the power limit PL(i) utilizing the following equation: PL(i)=f (V(i), Temp(i), SOC(i), I(i)), wherein PL(i) is greater than PL(i−1). After step 296, the method advances to step 298.

At step 298, the microprocessor 110 transmits a message M(i) having the power limit PL(i) through the communication bus 30 to the vehicle controller 20. After step 298, the method advances to step 300.

At step 300, the vehicle controller 20 commands the vehicle inverter 40 that is removably electrically coupled to the battery pack 60 to extract an amount of power from the battery pack 60 equal to the power limit PL(i) in response to the message M(i). After step 300, the method advances to step 258.

Figure 5:
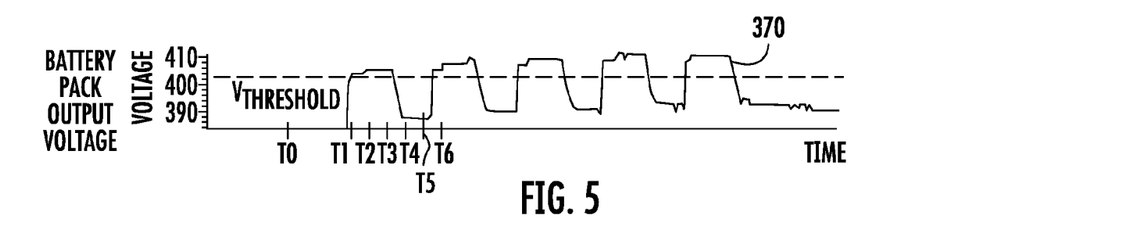
FIG. 5 is a graph of an exemplary battery pack output voltage over time associated with the battery pack.

Referring to FIG. 5, a graph 370 indicates an exemplary battery pack output voltage over time associated with the battery pack 60. Also, referring to FIG. 6, a graph 380 indicates a determined power limit over time associated with the battery pack 60. The power limit curve shown in FIG. 6 indicates exemplary maximum desired amounts of power that the vehicle inverter 40 could extract from the battery pack 60 over time.

Figure 6:
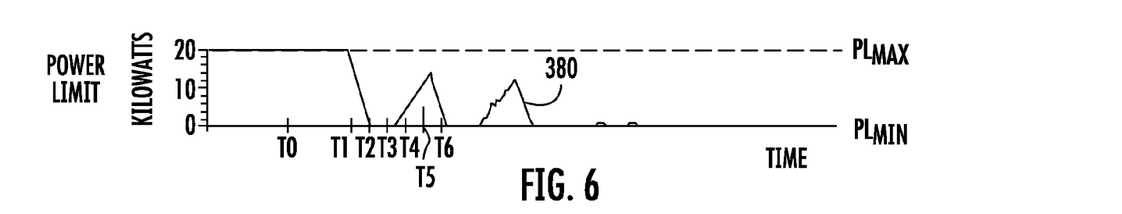
FIG. 6 is a graph of an exemplary graph of a power limit over time associated with the battery pack.

At time T1, referring to graph 370, a battery pack output voltage is greater than a threshold battery pack voltage $V_{Threshold}$ (shown in dashed lines). In response to the foregoing operational condition, referring to graph 380, the microprocessor 110 determines a power limit at time T1 that is less than a power limit at time T0, if the power limit at T1 is greater than the minimum power limit $PL_{MIN}$. In other words, the microprocessor 110 derates or reduces the power limit at time T1.

At time T2, referring to graph 370, the battery pack output voltage is still greater than the threshold battery pack voltage $V_{Threshold}$ (shown in dashed lines). In response to the foregoing operational condition, referring to graph 380, the microprocessor 110 determines a power limit at time T2 that is less than a power limit at time T1, if the power limit at T2 is greater than the minimum power limit $PL_{MIN}$ as compared to the power limit at time T0.

At time T3, referring to graph 370, the battery pack output voltage is still greater than the threshold battery pack voltage $V_{Threshold}$ (shown in dashed lines). In response to the foregoing operational conditions, referring to graph 380, the microprocessor 110 determines sets a power limit at time T3 equal to the power limit at time T2, since the power limit at T2 is substantially equal to the minimum power limit $PL_{MIN}$.

At time T4, referring to graph 370, the battery pack output voltage is not greater than the threshold battery pack voltage $V_{Threshold}$ (shown in dashed lines). In response to the foregoing operational conditions, referring to graph 380, the microprocessor 110 determines the power limit at time T4 that is greater than the power limit at time T3, if the power limit at time T4 is less than the maximum power limit $PL_{MAX}$.

At time T5, referring to graph 370, the battery pack output voltage is not greater than the threshold battery pack voltage $V_{Threshold}$ (shown in dashed lines). In response to the foregoing operational condition, referring to graph 380, the microprocessor 110 determines the power limit at time T5 that is greater than the power limit at time T4, if the power limit at T5 is less than the maximum power limit $PL_{MAX}$.

At time T6, referring to graph 370, the battery pack output voltage is greater than the threshold battery pack voltage $V_{Threshold}$ (shown in dashed lines). In response to the foregoing operational condition, referring to graph 380, the microprocessor 110 determines the power limit at time T6 that is less than the power limit at time T5, if the power limit at T6 is greater than the minimum power limit $PL_{MIN}$.

Figure 4:
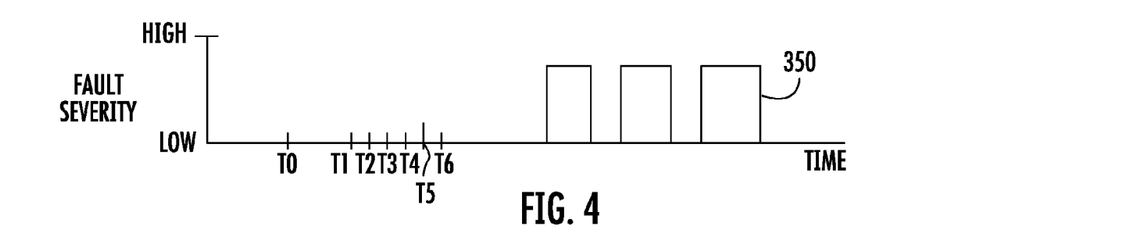
FIG. 4 is a graph of an exemplary operational fault severity level over time associated with the battery pack.

Referring to FIG. 4, a graph 350 indicates an exemplary operational fault severity level over time associated with the battery pack 60. Since the operational fault severity of the battery pack 60 does not reach the "high" level, the microprocessor 110 generates control signal to induce the control circuit 50 to electrically couple the battery pack 60 to the vehicle inverter 40. Alternately, if the operational fault severity of the battery pack 60 would reach the "high" level, the microprocessor 110 would generate control signal 50 to induce the control circuit to electrically de-couple the battery pack 60 from the vehicle inverter 40.

The system 70 for derating a power limit associated with a battery pack 60 and the method for derating the power limit provide a substantial advantage over other systems and methods. In particular, the system 70 measures a battery pack output voltage to determine when to derate a power limit associated with the battery pack 60.

The microprocessor 111 is provided to execute software algorithms for implementing at least part of the steps in the method described in FIGS. 2-3. In particular, the method described herein can be at least partially embodied in the form of one or more computer readable media having computer-executable instructions for practicing the method. The computer-readable media can comprise one or more volatile memory devices and/or one or more non-volatile memory devices wherein when the computer-executable instructions are loaded into one or more of the memory devices and executed by the microprocessor 111, the microprocessor 111 becomes an apparatus programmed to implement at least part of the method described herein.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A system for derating a power limit associated with a battery pack, comprising:

a battery pack voltage sensor configured to measure a first battery pack output voltage of the battery pack at a first time;

a microprocessor programmed to operably communicate with the battery pack voltage sensor, the microprocessor further programmed to determine an initial power limit of the battery pack based on at least one operational parameter of the battery pack;

the microprocessor further programmed to determine whether the first battery pack output voltage is less than a first voltage;

the microprocessor further programmed to determine whether the first battery pack output voltage is greater than a threshold battery pack voltage, if the first battery pack output voltage is less than the first voltage; the threshold battery pack voltage being less than the first voltage, the threshold battery pack voltage being greater than zero volts;

the microprocessor further programmed to determine whether the initial power limit is equal to a minimum power limit of the battery pack, if the first battery pack output voltage is greater than the threshold battery pack voltage and less than the first voltage;

the microprocessor further programmed to determine a first power limit of the battery pack that is less than the initial power limit, if the first battery pack output voltage is greater than the threshold battery pack voltage and less than the first voltage, and the initial power limit is not equal to the minimum power limit of the battery pack;

the microprocessor further programmed to transmit a first message having the first power limit on a communication bus; and a control circuit configured to selectively electrically decouple the battery pack from a vehicle inverter if the battery pack output voltage is greater than the first voltage, in response to a control signal from the microprocessor.

2. The system of claim 1, wherein:
the battery pack voltage sensor further configured to measure a second battery pack output voltage of the battery pack at a second time, the second time being after the first time;
the microprocessor further programmed to determine whether the second battery pack output voltage is greater than the threshold battery pack voltage;
the microprocessor further programmed to determine a second power limit of the battery pack that is less than the first power limit if the second battery pack output voltage is greater than the threshold battery pack voltage; and
the microprocessor further programmed to transmit a second message having the second power limit on the communication bus.

3. The system of claim 2, wherein:
the battery pack voltage sensor further configured to measure a third battery pack output voltage of the battery pack at a third time, the third time being after the second time;
the microprocessor further programmed to determine whether the third battery pack output voltage is greater than the threshold battery pack voltage;
the microprocessor further programmed to set a third power limit of the battery pack equal to the second power limit, if the third battery pack output voltage is greater than the threshold battery pack voltage, and if the second power limit is equal to a minimum power limit; and
the microprocessor further programmed to transmit a third message having the third power limit on the communication bus.

4. The system of claim 2, wherein:
the battery pack voltage sensor further configured to measure a third battery pack output voltage of the battery pack at a third time, the third time being after the second time;
the microprocessor further programmed to determine whether a third battery pack output voltage is greater than the threshold battery pack voltage;
the microprocessor further programmed to determine a third power limit of the battery pack that is greater than the second power limit if the third battery pack output voltage is not greater than the threshold battery pack voltage; and
the microprocessor further programmed to transmit a third message having the third power limit on the communication bus.

5. The system of claim 4, wherein:
the battery pack voltage sensor further configured to measure a fourth battery pack output voltage of the battery pack at a fourth time, the fourth time being after the third time;
the microprocessor further programmed to determine whether the fourth battery pack output voltage is greater than the threshold battery pack voltage;
the microprocessor further programmed to determine a fourth power limit of the battery pack that is greater than the third power limit if the fourth battery pack output voltage is not greater than the threshold battery pack voltage; and
the microprocessor further programmed to transmit a fourth message having the fourth power limit on the communication bus.

6. The system of claim 5, wherein:
the battery pack voltage sensor further configured to measure a fifth battery pack output voltage of the battery pack at a fifth time, the fifth time being after the fourth time;
the microprocessor further programmed to determine whether the fifth battery pack output voltage is greater than the threshold battery pack voltage;
the microprocessor further programmed to determine a fifth power limit of the battery pack that is less than the fourth power limit, if the fifth battery pack output voltage is greater than the threshold battery pack voltage; and
the microprocessor further programmed to transmit a fifth message having the fifth power limit on the communication bus.

7. The system of claim 1, further comprising a vehicle controller programmed to receive the first message from the communication bus, the vehicle controller further programmed to command an inverter to extract an amount of power from the battery pack equal to the first power limit in response to the first message.

8. A method for derating a power limit associated with a battery pack, comprising:
determining an initial power limit of the battery pack based on at least one operational parameter of the battery pack utilizing a microprocessor;
Determining whether a first battery pack output voltage is less than a first voltage, utilizing the microprocessor;
determining whether the first battery pack output voltage of the battery pack is greater than a threshold battery pack voltage, if the first battery pack output voltage is less than the first voltage, utilizing the microprocessor; the threshold battery pack voltage being less than the first voltage, the threshold battery pack voltage being greater than zero volts;
determining whether the initial power limit is equal to a maximum power limit of the battery pack, if the first battery pack output voltage is greater than the threshold battery pack voltage and less than the first voltage, utilizing the microprocessor;
determining a first power limit of the battery pack that is less than the initial power limit if the first battery pack output voltage is greater than a threshold battery pack voltage and less than the first voltage, and the initial power limit is not equal to the minimum power limit of the battery pack utilizing the microprocessor; and
transmitting a first message having the first power limit on a communication bus utilizing the microprocessor.

9. The method of claim 8, further comprising:
determining whether a second battery pack output voltage of the battery pack at a second time is greater than the threshold battery pack voltage, utilizing the microprocessor, the second time being after the first time;
determining a second power limit of the battery pack that is less than the first power limit if the second battery pack output voltage is greater than the threshold battery pack voltage, utilizing the microprocessor; and
transmitting a second message having the second power limit on the communication bus utilizing the microprocessor.

10. The method of claim 9, further comprising:
determining whether a third battery pack output voltage of the battery pack at a third time is greater than the threshold battery pack voltage, utilizing the microprocessor, the third time being after the second time;

setting a third power limit of the battery pack equal to the second power limit, if the third battery pack output voltage is greater than the threshold battery pack voltage, and if the second power limit is equal to a minimum power limit, utilizing the microprocessor; and transmitting a third message having the third power limit on the communication bus utilizing the microprocessor.

11. The method of claim 9, further comprising:
determining whether a third battery pack output voltage of the battery pack at a third time is greater than the threshold battery pack voltage, utilizing the microprocessor, the third time being after the second time;
determining a third power limit of the battery pack that is greater than the second power limit if the third battery pack output voltage is not greater than the threshold battery pack voltage, utilizing the microprocessor; and
transmitting a third message having the third power limit on the communication bus utilizing the microprocessor.

12. The method of claim 11, further comprising:
determining whether a fourth battery pack output voltage of the battery pack at a fourth time is greater than the threshold battery pack voltage, utilizing the microprocessor, the fourth time being after the third time;
determining a fourth power limit of the battery pack that is greater than the third power limit if the fourth battery pack output voltage is not greater than the threshold battery pack voltage, utilizing the microprocessor; and
transmitting a fourth message having the fourth power limit on the communication bus utilizing the microprocessor.

13. The method of claim 12, further comprising:
determining whether a fifth battery pack output voltage of the battery pack at a fifth time is greater than the threshold battery pack voltage, utilizing the microprocessor, the fifth time being after the fourth time;
determining a fifth power limit of the battery pack that is less than the fourth power limit, if the fifth battery pack output voltage is greater than the threshold battery pack voltage, utilizing the microprocessor; and
transmitting a fifth message having the fifth power limit on the communication bus utilizing the microprocessor.

14. The method of claim 8, further comprising:
receiving the first message from the communication bus at a vehicle controller; and
commanding an inverter to extract an amount of power from the battery pack equal to the first power limit utilizing the vehicle controller.

15. A system for derating a power limit associated with a battery pack, comprising:
a battery pack voltage sensor configured to measure a first battery pack output voltage of the battery pack at a first time;
a microprocessor programmed to operably communicate with the battery pack voltage sensor, the microprocessor further programmed to determine an initial power limit of the battery pack based on an operational parameter of the battery pack;
the microprocessor further programmed to determine whether the first battery pack output voltage is between a threshold battery pack voltage and a first voltage; the threshold battery pack voltage being less than the first voltage, the threshold battery pack voltage being greater than zero volts;
between the threshold battler pack voltage and the first volts;
the microprocessor further programmed to determine a first power limit of the battery pack that is less than the initial power limit, if both the first battery pack output voltage is between the threshold battery pack voltage and the first first voltage, and the initial power limit is not equal to the minimum power limit of the battery pack; and
the microprocessor further programmed to transmit a first message having the first power limit on a communication bus.

16. The system of claim 15, further comprising a vehicle controller programmed to receive the first message from the communication bus, the vehicle controller further programmed to command an inverter to extract an amount of power from the battery pack that is less than the first power limit in response to the first message.

* * * * *